(12) United States Patent
Thangadorai et al.

(10) Patent No.: US 10,354,618 B2
(45) Date of Patent: Jul. 16, 2019

(54) WIRELESS COMMUNICATION SYSTEM FOR OFFLINE PARTICIPATION IN A DISPLAY SESSION

(71) Applicant: Samsung Electronics Co., Ltd., Gyeonggi-do (KR)

(72) Inventors: Kavin Kumar Thangadorai, Bangalore (IN); Mohammed Inthiqab, Bangalore (IN); Srikrishna Sadula, Bangalore (IN); Vaibhav Khandelwal, Bangalore (IN)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 335 days.

(21) Appl. No.: 13/946,037

(22) Filed: Jul. 19, 2013

(65) Prior Publication Data

US 2014/0022146 A1 Jan. 23, 2014

(30) Foreign Application Priority Data

Jul. 19, 2012 (IN) .......................... 2952/CHE/2012

(51) Int. Cl.
*G06F 3/14* (2006.01)
*G09G 5/12* (2006.01)
(Continued)

(52) U.S. Cl.
CPC ........... *G09G 5/12* (2013.01); *H04N 21/4122* (2013.01); *H04N 21/43615* (2013.01);
(Continued)

(58) Field of Classification Search
CPC ......... H04N 21/4122; H04N 21/43615; H04N 21/43637; H04N 21/64707;
(Continued)

(56) References Cited

U.S. PATENT DOCUMENTS

2001/0046212 A1* 11/2001 Nakajima ............... H04L 45/02
370/278
2006/0120355 A1* 6/2006 Zreiq ................. H04L 29/06027
370/352
(Continued)

FOREIGN PATENT DOCUMENTS

CN 102332205 A 1/2012
WO 2011/083716 A1 7/2011

OTHER PUBLICATIONS

Yoon, Hayoung, et al.; "Collaborative Streaming-Based Media Content Sharing in WiFi-Enabled Home Networks;" IEEE Transactions on Consumer Electronics, vol. 56, No. 4; Nov. 2010.
(Continued)

*Primary Examiner* — Kamal B Divecha
*Assistant Examiner* — Clifton Houston
(74) *Attorney, Agent, or Firm* — Cha & Reiter, LLC.

(57) ABSTRACT

A system that enhances Wi-Fi display and enables a non WFD device to establish a session with a WFD source in an existing WFD session and to function as an offline WFD source without terminating an existing WFD session. The system enables an offline WFD source to stream multimedia content and control packets to sinks via the WFD source and control packets from the sinks to the offline WFD source. The system eliminates a need to reestablish a new session and improves workflow and a user experience.

12 Claims, 7 Drawing Sheets

(51) Int. Cl.
*H04N 21/41* (2011.01)
*H04N 21/436* (2011.01)
*H04N 21/4363* (2011.01)
*H04N 21/647* (2011.01)
*H04W 4/00* (2018.01)
*H04W 76/14* (2018.01)
*H04W 88/04* (2009.01)

(52) U.S. Cl.
CPC .......................... *H04N 21/43637* (2013.01); *H04N 21/64707* (2013.01); *H04W 4/00* (2013.01); *G06F 3/1423* (2013.01); *G06F 3/1454* (2013.01); *G09G 2370/16* (2013.01); *H04W 76/14* (2018.02); *H04W 88/04* (2013.01)

(58) Field of Classification Search
CPC ....... H04N 21/43635; H04N 21/41407; H04N 21/4788; H04N 21/632; G09G 5/12; H04W 4/00; H04W 76/023; H04W 4/06; H04W 8/24; H04W 88/04; G06F 3/1423; G06F 3/1454; H04L 65/4076; H04L 65/1069; H04L 12/2809; H04L 67/12; H04L 67/16; H04L 67/04; H04L 67/39; H04L 69/24; H04L 29/06; H04L 51/046; H04L 63/061; H04L 65/4084; H04L 67/104
See application file for complete search history.

(56) References Cited

U.S. PATENT DOCUMENTS

| | | | | |
|---|---|---|---|---|
| 2008/0061578 | A1* | 3/2008 | Igoe | H04L 12/2809 296/68.1 |
| 2010/0211689 | A1* | 8/2010 | Bijwaard | H04N 21/6405 709/228 |
| 2011/0149806 | A1 | 6/2011 | Verma et al. | |
| 2011/0304443 | A1* | 12/2011 | Sheridan | H04N 7/163 340/12.5 |
| 2012/0051345 | A1* | 3/2012 | Vedantham | H04L 67/104 370/338 |
| 2012/0054353 | A1* | 3/2012 | Jung | H04W 88/04 709/227 |
| 2012/0158981 | A1* | 6/2012 | Desai | H04L 67/1093 709/230 |
| 2012/0250576 | A1* | 10/2012 | Rajamani | H04W 40/24 370/254 |
| 2012/0280907 | A1 | 11/2012 | Masaki et al. | |
| 2012/0322391 | A1* | 12/2012 | Suzuki | H04W 12/06 455/68 |
| 2013/0139210 | A1* | 5/2013 | Huang | H04W 4/06 725/109 |
| 2013/0185447 | A1* | 7/2013 | Nagawade | H04W 8/005 709/228 |

OTHER PUBLICATIONS

Edwards et al., "An Extensible Set-Top Box Platform for Home Media Applications", Nov. 1, 2005, XP-055083444.
Topolsky, "Apple TV review (2010)", Sep. 29, 2010, http://www.engadget.com/2010/09/29/apple-tv-review-2010, XP-055028313.
"Wi-Fi Alliance Member Symposium", Apr. 21, 2011, Wi-Fi Alliance, slides 1, 2, 146-165, 177-180, and 210-237, XP-055046396.
Wikipedia: "Airplay", Mar. 26, 2012, XP055119821, URL: http://en.wikipedia.org/w/index.php?title=AirPlay&oldid=484084653.
European Search Report, dated Nov. 24, 2016.
Wang; "Chip Technology Lights Up the Future"; Popular Computer Week.
Chinese Search Report dated Sep. 20, 2017.
Wi-Fi Display Technical Specification Version 1.1; Wi-Fi Alliance; 2012.

* cited by examiner ically explained in the U.S. patent publication US 10,354,618 B2, while the non-limiting embodiments are described in the attached drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

WIRELESS COMMUNICATION SYSTEM FOR OFFLINE PARTICIPATION IN A DISPLAY SESSION

CROSS RELATED APPLICATION

This application claims priority under 35 U.S.C. § 119(a) to a Indian Patent Application filed in the Indian Patent Office on Jul. 19, 2012 and assigned Serial No. 2952/CHE/2012, the content of which is incorporated herein by reference.

FIELD OF INVENTION

The present disclosure relates to a Wireless Fidelity (Wi-Fi) display session and more particularly relates to offline participation of non WFD (Wi-Fi display) devices in the Wi-Fi display session.

BACKGROUND

As usage of wireless technology expands, Wi-Fi chipsets are employed in many types of devices and Wi-Fi applications have expanded to cover more than its core networking market. Today, Wi-Fi is found in smart phones, tablets, peripherals, TVs, set-top boxes and the like. Emerging Wi-Fi technology includes a Wi-Fi Display (WFD) system with an ability to transmit audio-visual content over Wi-Fi and encompasses cable-free operation in living rooms. WFD enables consumers to mirror the display of a mobile device on another display in real-time to reliably move and view content among various devices.

WFD discovers, connects and renders multimedia content sourced from a WFD source device to WFD sink devices. A WFD source is a multimedia content provider which sends content information to WFD primary sinks and WFD secondary sinks. WFD primary sinks are capable of rendering both audio and video streams whereas WFD secondary sinks render only an audio stream, with an optional coupling existing between these sinks. As per a known WFD specification, multiple sources are not possible in a Wi-Fi display session, only one WFD source with WFD primary or secondary sinks are possible in a WFD session. Non capable WFD devices cannot participate in the operation of an already existing WFD session. The standard requirements of the known WFD specification require that if a new device with WFD capability desires to share its multimedia content and participate as a source, a first existing WFD session has to be terminated and a regrouping performed. Further, a new WFD session begins with the new device acting as the WFD source. This is a time consuming process. Moreover, if the new device is not WFD enabled it further requires Media Access Layer (MAC) and physical layer (PHY) changes so as to participate as a source in a WFD session.

Therefore, known systems fail to comprehensively allow an interested non WFD device to participate as a WFD source in an existing WFD session. A system according to invention principles addresses these deficiencies and related problems.

SUMMARY

A system according to invention principles supports participation of a non WFD device as an offline WFD source without disturbing an existing WFD session of a Wi-Fi Display network. The system enables a Wi-Fi device which is not capable of handling WFD sessions to participate as an offline source in WFD existing sessions without any changes in Media Access Layer (MAC) and physical layers (PHY).

The system establishes a Wi-Fi display (WFD) session by a non-Wi-Fi display (Non-WFD) device in a Wi-Fi display network, by requesting a WFD source in the WFD session for offline participation as a source by the Non-WFD device, receiving acknowledgment from the WFD source to the Non-WFD device in response to receiving the request and establishing the WFD session by the Non-WFD device in response to receiving the acknowledgement from the WFD source.

The system provides a Non-WFD device to establish a Wi-Fi display (WFD) offline session in a Wi-Fi display network, wherein the Non-WFD device comprises an integrated circuit further comprising at least one processor, at least one memory having computer program code within the circuit, the at least one memory and the computer program code are configured to operate with the at least one processor to cause the device to request a WFD source in the WFD session for offline participation as a source, receive acknowledgement from the WFD source in response to sending the request and establish the WFD session in response to receiving the acknowledgement from the WFD source.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
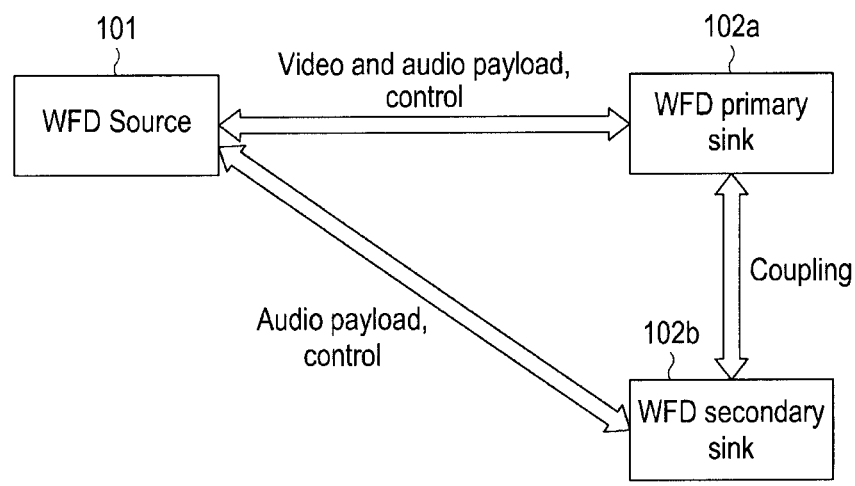
FIG. 1 illustrates an exemplary block diagram showing the Wi-Fi display components of the existing system.

The embodiments herein and the various features and advantageous details thereof are explained more fully with reference to the non-limiting embodiments that are illustrated in the accompanying drawings and detailed in the following description. For the purposes of clarity and simplicity, descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein. No claim element herein is to be construed under the provisions of 35 U.S.C. 112, sixth paragraph, unless the element is expressly recited using the phrase "means for".

The embodiments enable an interested non WFD device to actively participate as an offline WFD source by establishing an offline session with the WFD source in an existing WFD session without terminating the existing WFD session in a Wi-Fi Display network. The non WFD device streams multimedia contents and the control packets from a WFD source to the sink devices in the WFD session, while the control packets from the WFD sinks are also routed to an offline WFD source via the WFD source.

In an embodiment, the non WFD device may be a Wi-Fi P2P client connected in the same Wi-Fi P2P group but not included in the existing WFD session, a legacy device that is part of the Wi-Fi P2P group or in Basic Service Set (BSS) network or in other Wi-Fi cross connected networks and a Wi-Fi device incapable of handling WFD sessions, for example.

Throughout the description non capable WFD devices and non WFD devices are used interchangeably.

Throughout the description video data stream and video payload and multimedia content are used interchangeably. The term "offline" as used in the claims and description herein means not participating in communication in a WFD session using a WFD protocol.

Referring now to the drawings, and more particularly to FIGS. 1 through 6, where similar reference characters denote corresponding features consistently throughout the figures, there are shown preferred embodiments.

FIG. 1 illustrates an exemplary block diagram showing Wi-Fi display components. FIG. 1 comprises a WFD source 101, a WFD primary sink 102a and a WFD secondary sink 102b in a Wi-Fi network. The system depicts a WFD session as per the Wi-Fi display specification draft version 1.44 of the Wi-Fi alliance. A WFD session is made between the WFD source 101 which acts as the Wi-Fi network Group Owner (GO), while WFD primary sink 102a and secondary sink 102b act as Wi-Fi client devices where the Wi-Fi network can be Wi-Fi P2P, BSS networks and the like. The WFD source 101, the WFD primary sink 102a and the WFD secondary sink 102b are linked by either Wi-Fi Peer to Peer (P2P) network (also called Wi-Fi direct) or by using Tunneled Direct Link Setup (TDLS) protocol. Wi-Fi Direct is a standard mechanism supported by Wi-Fi alliance for Wi-Fi devices which enables connection of devices directly to each other and to transfer content and share applications. Products comprising Wi-Fi Direct certified devices can connect to one another without joining a traditional home, office or hotspot network. Devices can make a one-to-one connection, or a group of several devices can connect concurrently. Wi-Fi Direct connections are protected by Wi-Fi Protected Access II (WPA2) a Wi-Fi security system. With Wi-Fi Direct there is no need to have an access point (AP) or internet connection, making this a portable personal Wi-Fi network.

Wi-Fi certified TDLS (Tunneled Direct Link Setup) is an optional capability that enables devices in an infrastructure Wi-Fi (BSS) or Wi-Fi Direct network to automatically setup a secure, direct link between two devices. Connecting Wi-Fi TDLS-certified devices is automatic and requires no user intervention. TDLS is characterized by the use of signaling frames that are encapsulated in data frames that can be transmitted through the access point transparently. This is known as 'tunneling' the frame through the access point. Hence, Wi-Fi TDLS stations can set up direct links providing, in many scenarios, an improved user experience with respect to speed of connection and overall bandwidth efficiency. Products certified under the TDLS program have been tested for interoperability and WPA2 security, the current generation of security technology In the figure, the WFD source 101 is the multimedia content provider while WFD primary sink 102a is capable of rendering both audio and video payload whereas WFD secondary sink 102b renders only audio payload and there can exist optional coupling between a WFD primary sink 102a and a WFD secondary sink 102b. As per the WFD specification, there can be WFD primary and secondary sinks in a WFD session but only one WFD source. Multiple sources are not allowed to exist in a single group of WFD session.

The non WFD devices like other P2P clients or legacy clients in a Wi-Fi P2P group, other Wi-Fi peer devices which are cross connected with the Wi-Fi P2P network, other Wi-Fi peer devices in a BSS network cannot participate in operations of an existing WFD session. If any one of the above non WFD devices desires to participate as a new source, the existing WFD session has to be terminated and a new group needs to be established with a new source to start a new session. This is a time consuming, resource burdening process.

Figure 2:
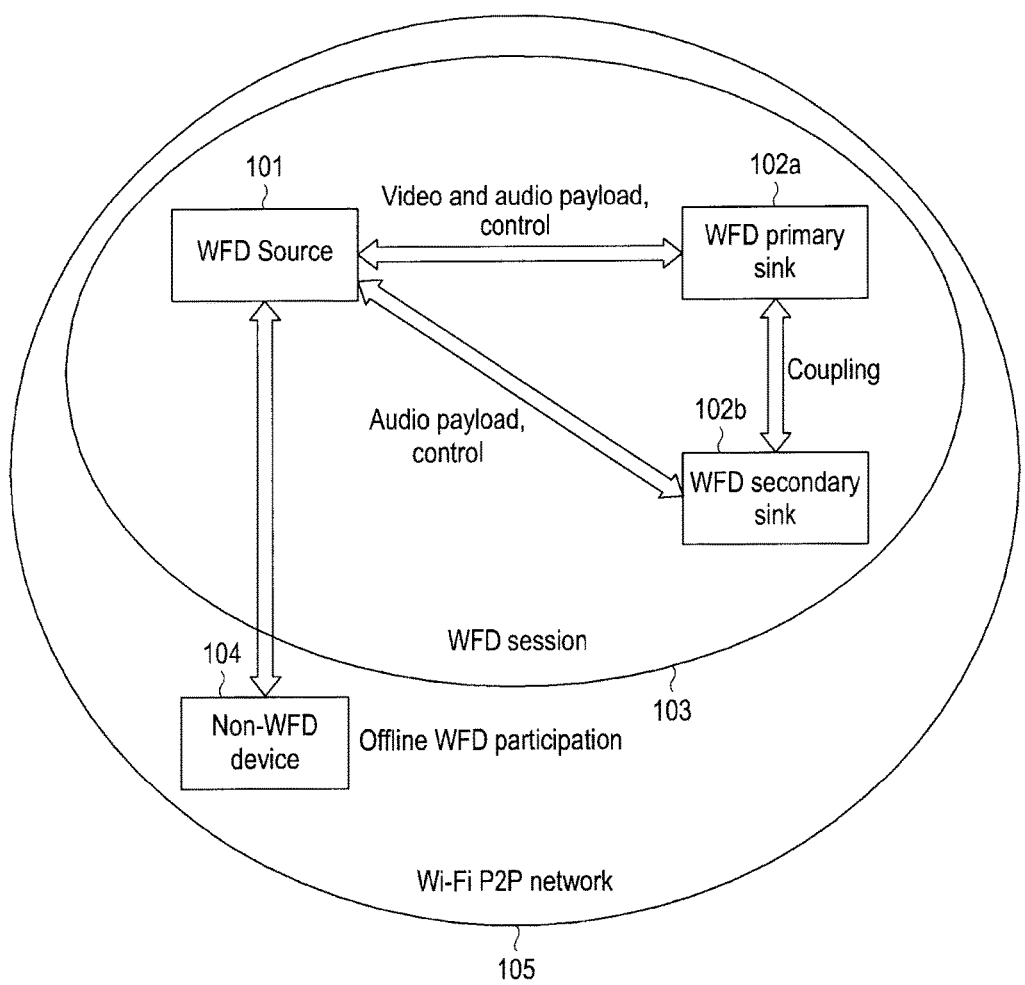
FIG. 2 illustrates the WFD offline participation in a Wi-Fi P2P Network, according to embodiments as disclosed herein.

FIG. 2 illustrates WFD offline participation in a Wi-Fi P2P Network, according to embodiments as disclosed herein. FIG. 2 comprises a WFD source 101, a WFD primary sink 102a, a WFD secondary sink 102b, WFD session 103, a non WFD device 104 and Wi-Fi P2P network 105. Wi-Fi P2P network 105 has a WFD session 103 within it, between the WFD source 101, the WFD primary sink 102a, and the WFD secondary sink 102b. The WFD source 101 is the multimedia content provider while WFD primary sink 102a is capable of rendering both audio and video payloads whereas WFD secondary sink 102b renders only audio payload and there can exist optional coupling between a WFD primary sink 102a and a WFD secondary sink 102b. The WFD source 101 is also the Group Owner (GO) in the Wi-Fi P2P network 105 while the WFD primary sink 102a, the WFD secondary sink 102b and the non WFD device 104 are the P2P clients or Legacy devices, each communicating with the WFD source 101 GO using Wi-Fi Peer to Peer link. The non WFD device 104 is not a participant in existing WFD session 103 but the system enables active participation of non WFD device 104 as an offline source without tearing down the existing WFD session 103. As the WFD specification allows existence of one source in a WFD session, the interested non WFD device 104 can request the WFD source 101 for making offline participation, by communicating over a P2P link with an offline source request. The system provides improved Real Time Streaming Protocol (RTSP) to get a parameter to enable a WFD offline source request-response function. The WFD source 101 receives the request and can reply with either positive or negative acknowledgement to the requesting non WFD device 104 in a source response packet. When the non WFD device 104 desires to participate in the WFD session as an offline WFD source, it makes a Transmission Control protocol (TCP) connection for a Real Time Streaming Protocol (RTSP) Session with the WFD source. The RTSP is a network control protocol designed for use in entertainment and communications systems to control streaming media servers. The protocol is used for establishing and controlling media sessions between end points. Clients of media servers issue VCR-like commands, such as play and pause, to facilitate real-time control of playback of media files from the server. Most RTSP servers use the Real-time Transport Protocol (RTP) in conjunction with Real-time Control Protocol (RTCP) for media stream delivery.

A TCP connection for an RTSP Session with the WFD source is made in response to an offline WFD source request packet and the WFD source responds to it. The WFD offline source sends the WFD offline source request frame at an arbitrary time, but the WFD source responds with a positive reply when the WFD connection is established with the WFD primary sink 102a and/or WFD secondary sink 102b. If the response received by non WFD device 104 is negative, the communication between WFD source 101 and non WFD device 104 terminates but if non WFD device 104 receives a positive acknowledgement, device 104 performs the WFD offline capability exchange and negotiation as per section 4.6 of the WFD specification. This phase is used to determine the set of parameters to be used for the WFD Offline session. Further WFD offline session establishment takes place between the WFD source 101 and the requesting non WFD device 104 as per section 4.8 of the WFD specification of the Wi-Fi alliance. In response to WFD offline session establishment, the multimedia and control packet offline streaming is initiated between the non WFD device 104 as an offline WFD source via WFD source 101 to the WFD primary sink 102a and WFD secondary sink 102b while the control packets from the WFD primary sink 102a and WFD secondary sink 102b are routed to the non WFD device 104 via WFD source 101. If non WFD device 104 desires to terminate the offline sourcing session it is done as per a standard WFD teardown procedure as specified in WFD specification section 4.12.

The WFD source 101 and the non WFD device 104 as a WFD offline source support WFD offline source request-response, WFD offline capability exchange and negotiation, WFD offline session establishment, WFD offline multimedia streaming and controls.

Figure 3:
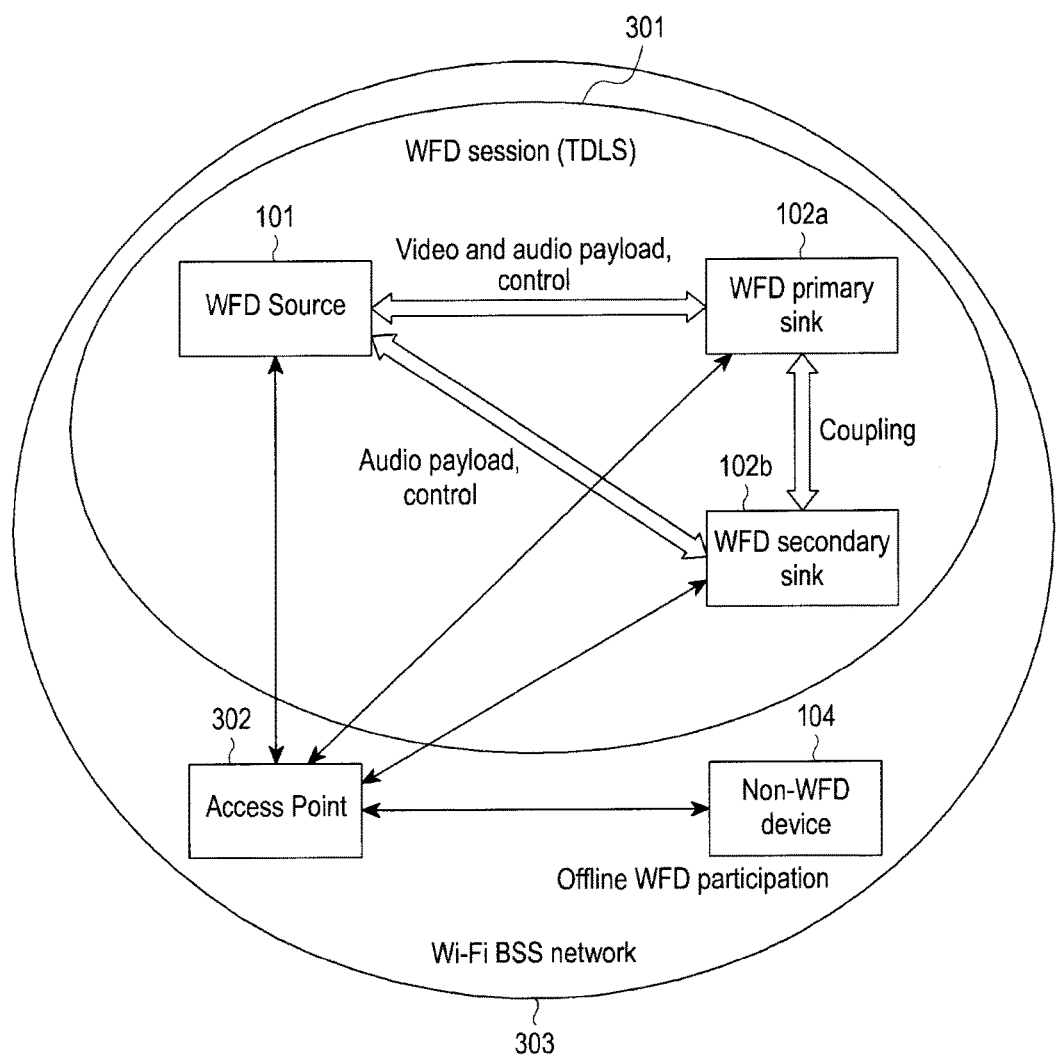
FIG. 3 illustrates the WFD offline participation in a BSS Network, according to embodiments as disclosed herein.

FIG. 3 illustrates the WFD offline participation in a BSS Network. FIG. 3 depicts a WFD source 101, a WFD primary sink 102a, a WFD secondary sink 102b, a non WFD device 104, a WFD session 301, an Access Point (AP) 302 and a Wi-Fi BSS network 303. The Wi-Fi BSS network 303 has existing WFD session 301 using the TDLS protocol within its network, the AP 302 which is linked with the devices in the network, and the non WFD device 104 interested in participating in the existing WFD session 301. The WFD source 101 and WFD sinks 102a, 102b support a TDLS connection link with the Wi-Fi BSS network 303. The Basic Service Set (BSS) is a component of the IEEE 802.11 WLAN architecture. This network architecture is built around a Basic Service Set (BSS), which comprises a set of stations (STAs) or the component that connects to the wireless medium such as a network adapter or Network Interface Card (NIC) that communicate with each other. When one access point (AP) is connected to a wired network and a set of wireless stations, it is referred to as a Basic Service Set (BSS).

The WFD session 301 is set up (per the known WFD specification) between the WFD source 101, the WFD primary sink 102a and WFD secondary sink 102b using TDLS protocol. The TDLS protocol is used to make the WFD session 301. In response to the TDLS connection being made, the WFD source 101 directly interacts with the sink without routing to the AP. An interested non WFD device 104 is able to make a request for participation as an offline WFD source to the WFD source 101, which may positively reply allowing the request to proceed as per the method described. The offline WFD source which is the non WFD device 104 connects with the WFD source 101 either using the TDLS connection or using the AP 302 route path depending on the TDLS support by the non WFD device 104. On establishment of an offline source session, offline streaming of the multimedia and control packets is initiated between the non WFD device 104 as an offline WFD source via WFD source 101 to the WFD primary sink 102a and WFD secondary sink 102b while the control packets from the WFD primary sink 102a and WFD secondary sink 102b are routed to the non WFD device 104 via WFD source 101. If non WFD device 104 wants to terminate the offline sourcing session it is done according to the WFD teardown as specified in WFD specification section 4.12.

Figure 4:
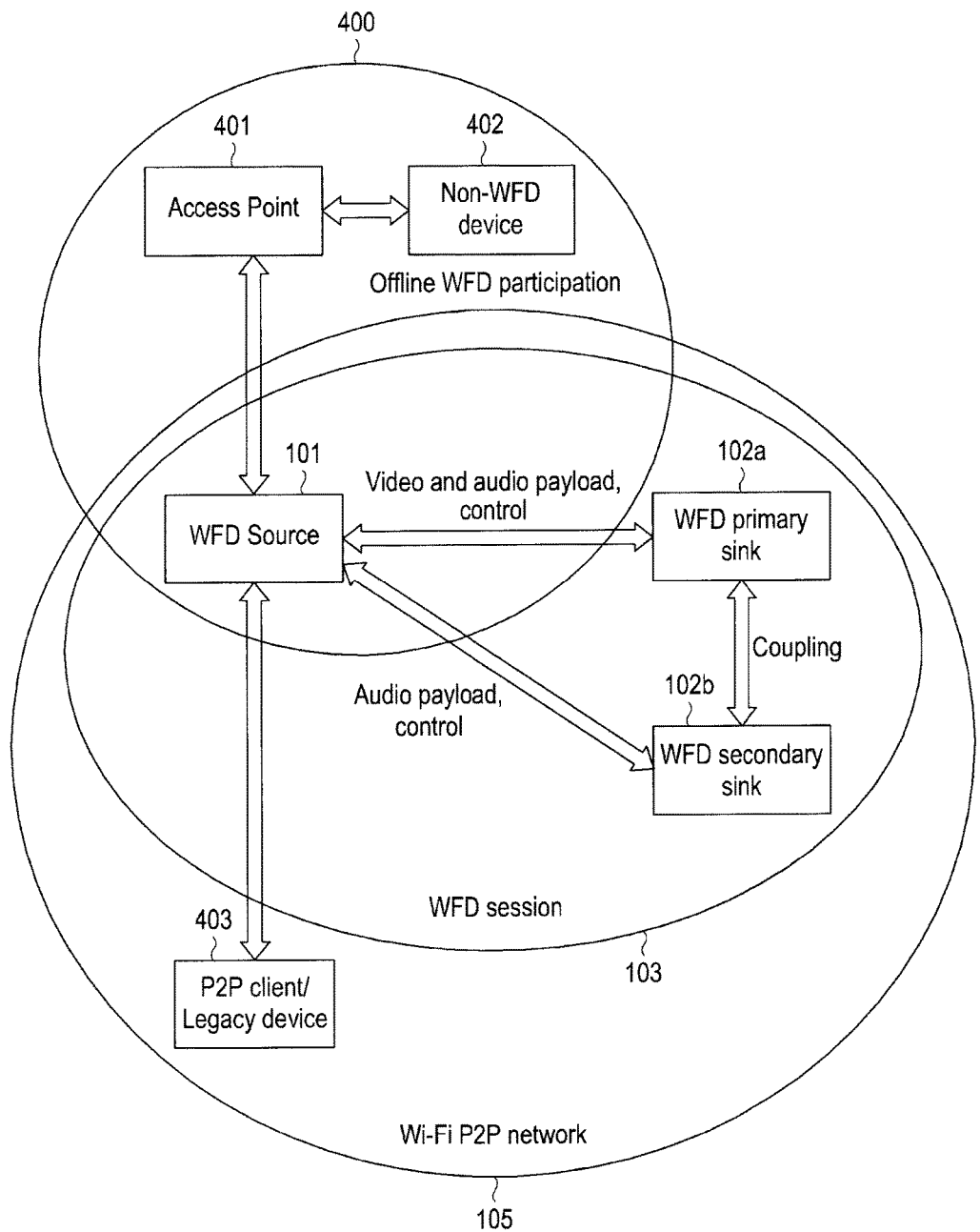
FIG. 4 illustrates the WFD offline participation in a Wi-Fi P2P Cross Connected Network, according to embodiments as disclosed herein.

FIG. 4 illustrates the WFD offline participation in Wi-Fi P2P Cross Connected Network, according to embodiments as disclosed herein. FIG. 4 depicts a WFD source 101, a WFD primary sink 102a, a WFD secondary sink 102b, WFD session 103, a Wi-Fi P2P network 105, a P2P client 403, a foreign BSS network 400, an AP 401 and a non WFD device 402. FIG. 4 depicts a wider cross connected network having the Wi-Fi P2P network 105 with established WFD session 103 and a non WFD device 403 in its network. The WFD source 101 which is the GO in the Wi-Fi P2P network 105 is cross connected with another foreign BSS network 400 having an AP 401. A non WFD device 402 interested to participate in WFD session 103 as an offline WFD source is connected to the AP 401. The non WFD device 402 in foreign BSS network (400) sends an off line source request to WFD source 101 through AP 401. On receiving request WFD source 101 may respond with a positive acknowledgement as an offline source response, further with completion of capability exchange and negotiation an offline session can be established. The non WFD device 402 can stream multimedia content to the WFD primary sink 102a and WFD secondary sink 102b. If non WFD device 402 desires to discontinue the established offline WFD session, the standard procedure defined in the known WFD specification for tear down is followed.

In an embodiment the cross connected network can be another Wi-Fi P2P network wherein WFD source 101 GO acts as a P2P client in another Wi-Fi P2P network.

Figure 5:
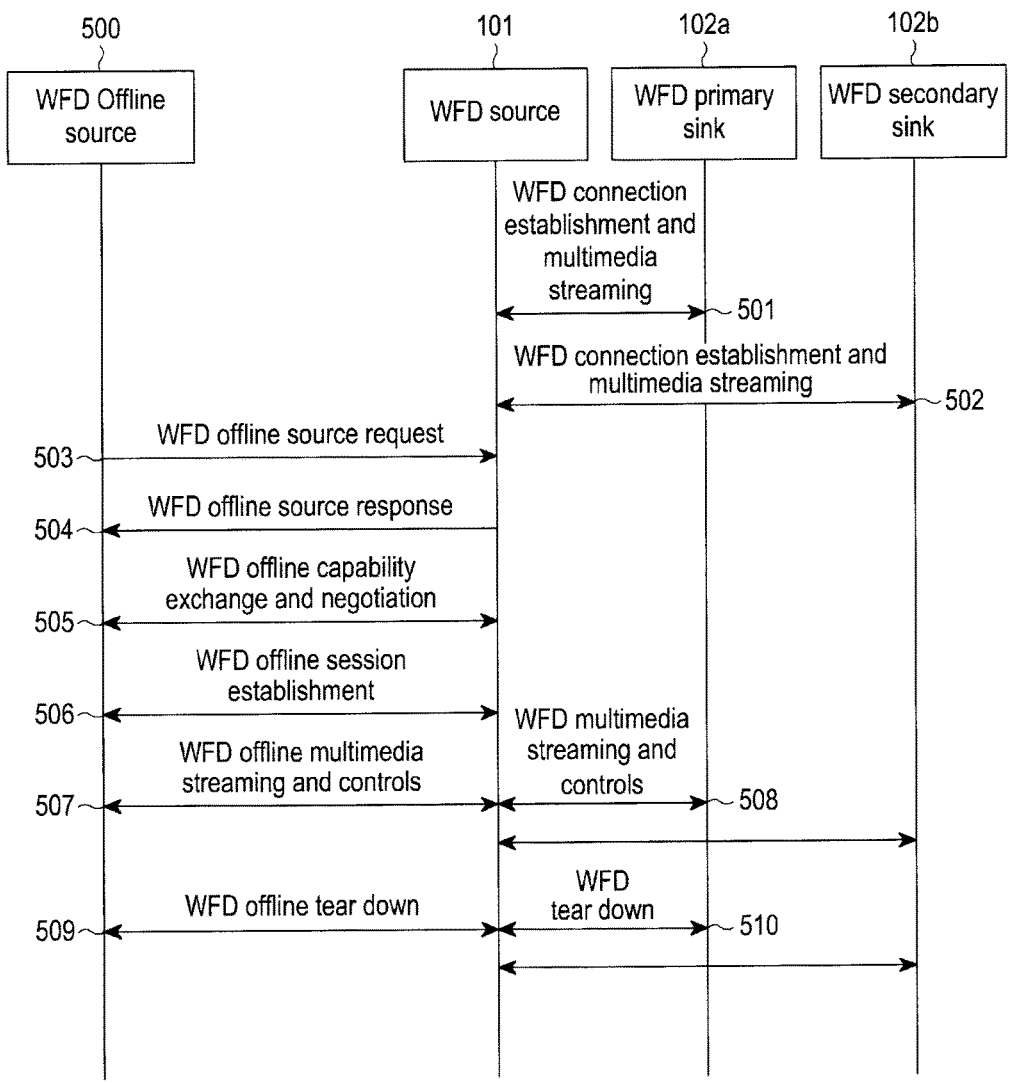
FIG. 5 illustrates the sequence flow diagram of WFD offline participation message exchanges, according to embodiments as disclosed herein.

FIG. 5 illustrates a sequence flow of WFD offline participation message exchanges, according to embodiments as disclosed herein. FIG. 5 comprises a WFD source 101, a WFD primary sink 102a, a WFD secondary sink 102b and an offline source 500. As depicted in FIG. 5, a WFD session is established between the WFD source 101 and the WFD primary sink 102a using a known standard WFD specification protocol. Further, the WFD source 101 streams (501) multimedia contents to WFD primary sink 102a. The WFD session is also established between WFD source 101 and WFD secondary sink 102b and WFD source streams (502) multimedia content to WFD secondary sink 102b as per the WFD specification. The offline source 500 in the Wi-Fi network is interested in streaming of multimedia content to the WFD primary sink 102a and WFD secondary sink 102b and requests (503) WFD source 101 to allow it to be an offline source. The WFD offline source 500 may send the WFD offline source request frame at any time, but the WFD source responds with a positive reply when the WFD connection is established with the WFD primary sinks 102*a* and/or WFD secondary sink 102*b*. The system provides a custom RTSP get parameter to perform the WFD offline source request-response such as, wfd_offline_source_req This get parameter is sent by the WFD offline source 500 to the WFD source 101 and WFD source 101 responds (504) with wfd_offline_source_req="wfd_offline_source_req:"SP response CRLF response="accept"/"reject"

In response to completion of WFD offline source request-response frames, WFD offline capability exchange and negotiation is initiated (505). This phase is used to determine the set of parameters to be used for the WFD offline session. The sequence of messages exchanged between the offline WFD source 500 and the WFD source 101 to perform the WFD offline capability exchange and negotiation is similar to the message exchanges as mentioned in WFD specification section 4.6. In an embodiment, the messages comprise RTSP URL, control packets, for example. Further WFD source 101 establishes (506) a WFD offline session with the offline source 500. WFD offline session establishment is performed using messages similar to the messages proposed in section 4.8 in the WFD specification. In response to WFD offline session establishment, the offline source 500 streams (507, 508) multimedia and control packets to the WFD primary sink 102*a* and WFD secondary sink 102*b* via WFD source 101 and the WFD primary sink 102*a* and WFD secondary sink 102*b* may send control packets via WFD source 101 to the offline source 500. If offline source 500 wants to end the session the WFD offline session teardown standard procedure (509, 510) as specified in WFD specification section 4.12 is followed. The method enables the WFD offline source 500 to perform the WFD offline capability exchange and negotiation, session establishment, maintenance, management of multimedia contents.

Figure 6:
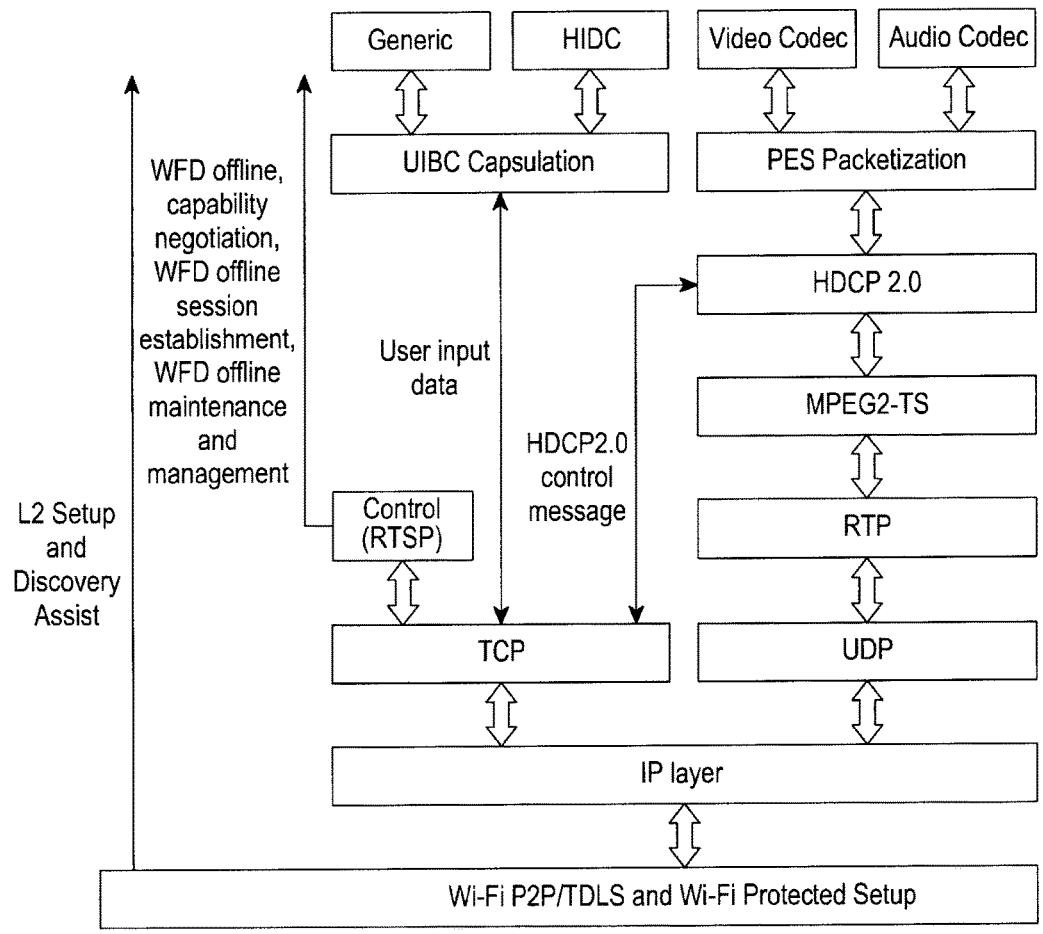
FIG. 6 illustrates the WFD offline participation architecture, according to embodiments as disclosed herein.

FIG. 6 illustrates the WFD offline participation architecture, according to embodiments as disclosed herein. FIG. 6 depicts the WFD architecture comprising of different functionally interconnected modules and protocols including Wi-Fi P2P/TDLS and Wi-Fi Protected Setup, the Internet Protocol (IP) layer, the TCP layer which is connected to the control (RTSP) module. The standard RTSP function enable devices participating in a WFD session to perform capability exchange and negotiation, session establishment, maintenance and management of multimedia contents. The system enhances the control (RTSP) by enabling the offline source to participate in existing WFD session from outside using request/response functions and enables performance of WFD offline capability exchange and negotiation, session establishment, maintenance and management of multimedia contents.

Figure 7:
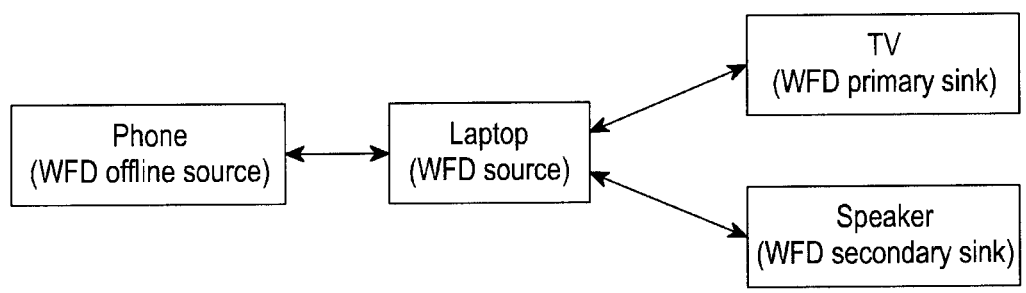
FIG. 7 illustrates an exemplary WFD offline participation in WFD session, according to embodiments as disclosed herein.

FIG. 7 illustrates an exemplary WFD offline participation in WFD session, according to embodiments as disclosed herein. A laptop is a WFD source which establishes a WFD session and streams the multimedia contents to a television participating in the WFD session as a WFD primary sink and speaker participating as a WFD secondary sink. The television can receive both audio and visual payload while the speaker receives the audio payload. The phone which is a non capable or non WFD device participates in the WFD session as an offline WFD source. The phone sends a WFD offline source request to the laptop and the laptop replies with either positive or negative acknowledgement in a WFD offline source response packet. If the phone receives positive acknowledgement in a WFD offline source response packet, the phone performs the WFD offline capability exchange and negotiation process and WFD offline session establishment with the Laptop. In response to the offline session being established the phone performs the multimedia streaming and controls with the sinks, the television and the speaker via the laptop.

The embodiments disclosed herein can be implemented through at least one software program running on at least one hardware device and performing network management functions to control the elements. The elements shown in FIGS. 1, 2 3, 4 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein. The processes and applications of FIGS. 1-7, in alternative embodiments, may be located on one or more (e.g., distributed) processing devices on a network linking the units of FIG. 1. Any of the functions and steps provided in FIGS. 1-7 may be implemented in hardware, software or a combination of both and may be performed in whole or in part within the programmed instructions of a computer.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The invention claimed is:
1. A method for establishing a Wi-Fi display (WFD) session by a non-Wi-Fi display (non-WFD) device in a Wi-Fi display network, the method comprising:

transmitting, by at least one processor of the non-WFD device, an offline source request message to a WFD source device for offline participation as a source for controlling a WFD sink device and providing content to the WFD sink device that is participating in the WFD session, wherein the non-WFD device is a Wi-Fi device that is incapable of handling the WFD session, and the WFD source device is connected to the WFD sink device in the WFD session, and the WFD session is established between the WFD source device and the WFD sink device using a WFD protocol and is not established by the non-WFD device;

receiving, by the at least one processor, a response to the offline source request message from the WFD source device, wherein the response to the offline source request message is positive if the WFD source device is in the WFD session with the WFD sink device;

in response to identifying the response being positive, performing, by the at least one processor, exchange of WFD offline capability for offline participation with the WFD source device;

establishing, by the at least one processor, a WFD offline session with the WFD source device to transmit the content from the non-WFD device to the WFD sink device via the WFD source device without tearing down the WFD session between the WFD source device and the WFD sink device, wherein the WFD offline session is established based on a Wi-Fi Peer to Peer (P2P) network or a Basic Service Set (BSS) network, wherein the non-WFD device does not participate in the WFD session using the WFD protocol;

transmitting, by the at least one processor, the content to the WFD source device based on the established WFD offline session, wherein the content is outputted by the WFD sink device, thereby enabling the non-WFD device to indirectly communicate with the WFD sink device;

controlling, by the at least one processor, the WFD source device to control the WFD sink device participating in the WFD session in response to establishing the WFD session; and in response to identifying the response being negative, terminating, by the at least one processor, communication with the WFD source device.

2. The method according to claim 1, wherein the WFD sink device comprises at least one of a WFD primary sink device and a WFD secondary sink device.

3. The method according to claim 2, wherein the at least one processor is further configured to control the non-WFD device to indirectly communicate with the at least one of the WFD primary sink device and the WFD secondary sink device through the WFD source device.

4. The method according to claim 1, wherein the Wi-Fi display network comprises at least one of Wi-Fi (Peer-to-Peer) P2P network, Wi-Fi Basic Service Set (BSS) network and cross connected Wi-Fi BSS network with Wi-Fi P2P network.

5. The method according to claim 1, wherein the at least one processor is further configured to control the non-WFD device to participate in the WFD session without change in at least one of (a) Media Access Layer (MAC) and (b) physical layers (PHY).

6. A non-WFD device to establish a Wi-Fi display (WFD) session in a Wi-Fi display network, the non-WFD device comprising:

a transceiver; and at least one processor configured to:

control the transceiver to transmit an offline source request message to a WFD source device for offline participation as a source for controlling a WFD sink device and providing content to the WFD sink device that is participating in the WFD session, wherein the non-WFD device is a Wi-Fi device that is incapable of handling the WFD session, and the WFD source device is connected to the WFD sink device in the WFD session, and the WFD session is established between the WFD source device and the WFD sink device using a WFD protocol and is not established by the non-WFD device, receive, via the transceiver, a response to the offline source request message from the WFD source device, wherein the response to the offline source request message is positive if the WFD source device is in the WFD session with the WFD sink device, in response to identifying the response being positive, perform exchange of WFD offline capability for offline participation with the WFD source device, establish a WFD offline session with the WFD source device to transmit the content from the non-WFD device to the WFD sink device via the WFD source device without tearing down the WFD session with the WFD sink device, wherein the WFD offline session is established based on a Wi-Fi Peer to Peer (P2P) network or a Basic Service Set (BSS) network, and the non-WFD device does not participate in the WFD session using the WFD protocol, transmit, via the transceiver, the content to the WFD source device based on the established WFD offline session, wherein the content is outputted by the WFD sink device, thereby enabling the non-WFD device to indirectly communicate with the WFD sink device, control the WFD source device to control the WFD sink device participating in the WFD session in response to establishing the WFD offline session, and in response to identifying the response being negative, terminate communication with the WFD source device.

7. The non-WFD device according to claim 6, wherein the at least one processor is configured to indirectly communicate with at least one of a WFD primary sink device and a WFD secondary sink device through the WFD source device.

8. The non-WFD device according to claim 6, wherein the at least one processor is further configured to control the non-WFD device to participate in the WFD session without change in at least one of (a) Media Access Layer (MAC) and (b) physical layers (PHY).

9. A computer-readable non-transitory storage medium storing instructions executable by a processing device for establishing a Wi-Fi display (WFD) session by a non-Wi-Fi display (non-WFD) device in a Wi-Fi display network, the instructions comprising:

transmitting, by at least one processor of the non-WFD device, an offline source request message to a WFD source device for offline participation as a source for controlling a WFD sink device and providing content to the WFD sink device that is participating in the WFD session, wherein the non-WFD device is a Wi-Fi device that is incapable of handling the WFD session, the WFD source device is connected to the WFD sink device in the WFD session, and the WFD session is established between the WFD source device and the WFD sink device using a WFD protocol and is not established by the non-WFD device;

receiving, by the at least one processor, a response to the offline source request message from the WFD source device, wherein the response to the offline source request message is positive if the WFD source device is in the WFD session with the WFD sink device;

in response to identifying the response being positive, performing, by the at least one processor, exchange of WFD offline capability for offline participation with the WFD source device;

establishing, by the at least one processor, a WFD offline session with the WFD source device to transmit the content from the non-WFD device to the WFD sink device via the WFD source device without tearing down the existing WFD session with the WFD sink device, wherein the WFD offline session is established based on a Wi-Fi Peer to Peer (P2P) network or a Basic Service Set (BSS) network, and wherein the non-WFD device does not participate in the WFD session using the WFD protocol;

transmitting, by the at least one processor, the content to the WFD source device based on the established WFD offline session, wherein the content is outputted by the WFD sink device, thereby enabling the non-WFD device to indirectly communicate with the WFD sink device;

controlling, by the at least one processor, the WFD source device to control the WFD sink device participating in the WFD session in response to establishing the WFD offline session; and in response to identifying the response being negative, terminating, by the at least one processor, communication with the WFD source device.

10. The computer-readable non-transitory storage medium according to claim 9, wherein the WFD sink device comprises at least one of a WFD primary sink device and a WFD secondary sink device.

11. The computer-readable non-transitory storage medium according to claim 10, wherein the at least one processor is further configured to control the non-WFD device to indirectly communicate with at least one of the WFD primary sink device and the WFD secondary sink device through the WFD source device.

12. The computer-readable non-transitory storage medium according to claim 9, wherein the Wi-Fi display network comprises at least one of Wi-Fi P2P (Peer-to-Peer) network, Wi-Fi Basic Service Set (BSS) network and cross connected Wi-Fi BSS network with Wi-Fi P2P network.

* * * * *